Jan. 3, 1956
M. L. B. McDANIEL
2,729,016
SWINGING FISH CONTAINER
Filed July 16, 1954
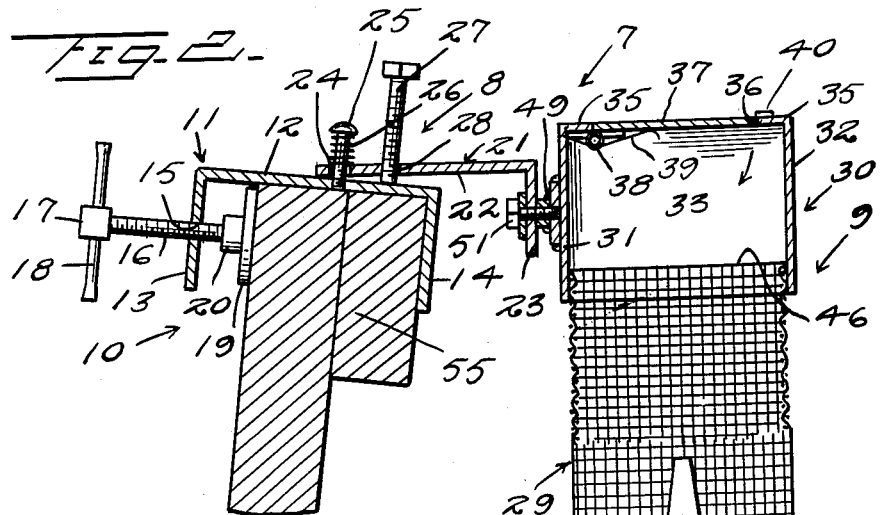
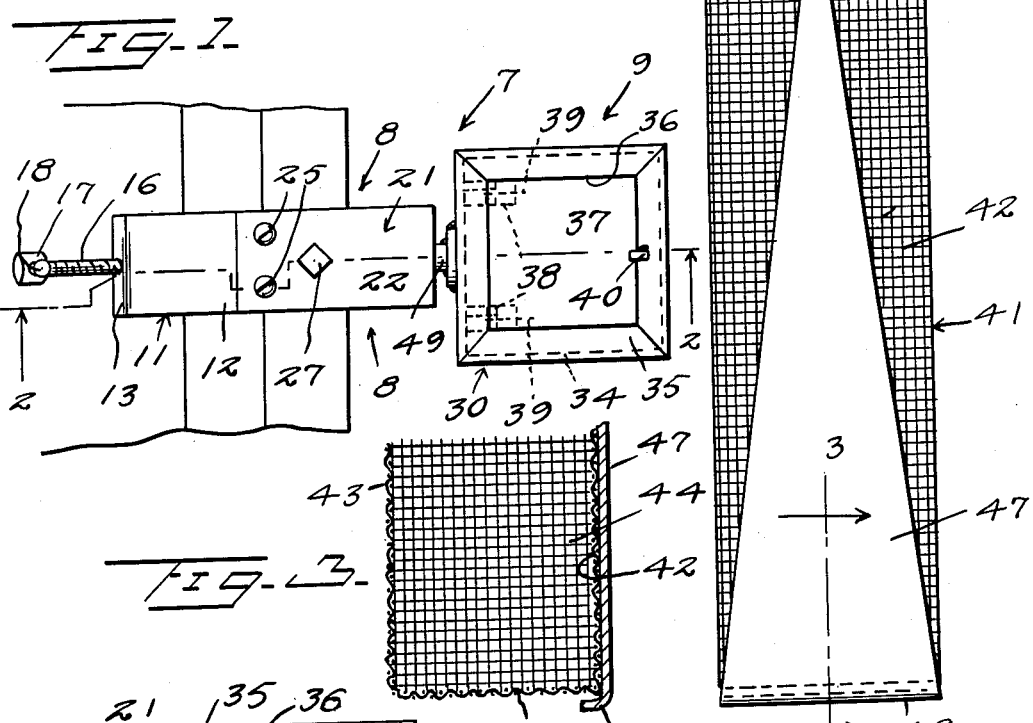
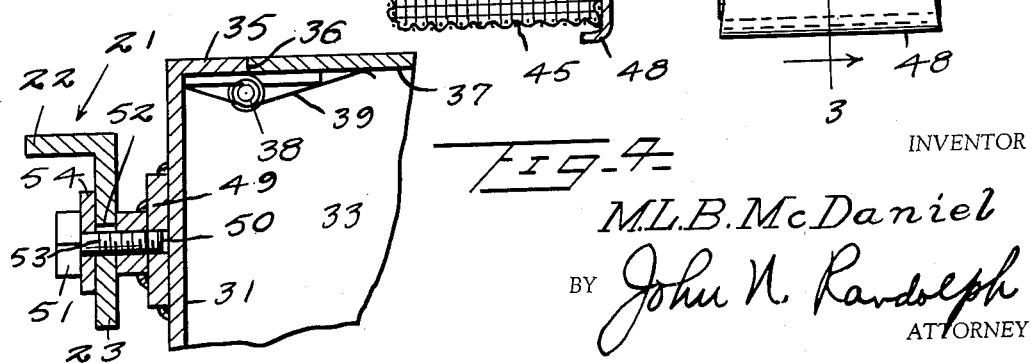
INVENTOR
M.L.B. McDaniel
BY John N. Randolph
ATTORNEY United States Patent Office 2,729,016
Patented Jan. 3, 1956

2,729,016

SWINGING FISH CONTAINER

Morris L. B. McDaniel, Haynesville, La.

Application July 16, 1954, Serial No. 443,844

5 Claims. (Cl. 43—55)

This invention relates to a novel construction of fish container and means for adjustably and swingably mounting the container outboard with respect to a side of a boat hull so that a substantial part of the perforated container will be submerged to keep fish alive therein.

Another object of the invention is to provide a novel fish container and mounting means therefor wherein the container due to its unique construction will glide along the water with substantially no part thereof submerged for a relatively short period of time when the boat on which the container is supported is underway and moving forwardly at a speed faster than a slow trolling speed, to prevent drowning of fish within the container and to prevent the container from striking obstructions disposed below the water level.

Another object of the invention is to provide a novel means for swingably supporting the container is an outboard position relatively to a side of a boat hull and whereby the container is disposed substantially in a vertical plane to enable the container to readily swing in a vertical plane for passing over obstructions and for gliding along the surface of the water.

Still a further object of the invention is to provide a container which is so constructed that a part thereof will function as a shield to prevent drowning of fish within the container when the boat on which the container is supported is underway and traveling at a slow trolling speed so that a lower part of the container is submerged.

Various other objects and advantages of the invention will hereinafter become more fully apparent from the following description of the drawing, illustrating a presently preferred embodiment thereof, and wherein:

Figure 1 is a top plan view of the invention shown in an applied position;

Figure 2 is an enlarged vertical sectional view thereof, partly in front elevation, taken substantially along a plane as indicated by the line 2—2 of Figure 1;

Figure 3 is a vertical sectional view taken substantially along a plane as indicated by the line 3—3 of Figure 2, through the lower portion of the container, and Figure 4 is an enlarged fragmentary vertical sectional view of a part of the upper portion of the container and showing the mounting thereof on the supporting means.

Referring more specifically to the drawing, the swingable fish container and its mounting means, comprising the invention, is designated generally 7 and includes a mounting unit, designated generally 8, and a container for fish or the like, designated generally 9.

The mounting unit 8 includes a clamp, designated generally 10, including an arch shaped frame 11, similar to the frame of a conventional C clamp. The frame 11 includes a substantially flat and straight top part or bight portion 12 and depending ends forming legs 13 and 14, which are disposed substantially parallel to one another. The leg 13 is provided with a substantially centrally disposed threaded opening 15 through which a feed screw 16 threadedly extends. Said feed screw 16 has a head 17 at its outer end provided with a conventional cross pin 18 forming a handle and which may be slidably disposed in the head 17. A plate 19, forming a movable jaw of the clamp 10, is provided on one side thereof with a socket 20 in which the other inner end of the feed screw 16 is turnably confined in a conventional manner for swivelly connecting the movable jaw 19 to the feed screw. The jaw 19 is disposed between the frame legs 13 and 14 and is movable by actuation of the feed screw 16 toward or away from the outer frame leg 14, constituting a stationary jaw of the clamp 10.

The mounting unit 8 also includes a bar forming a bracket arm, designated generally 21 and which includes an elongated substantially straight portion 22 provided at an outer end thereof with a depending extension 23, which is disposed at substantially a right angle to the arm portion 22. The arm portion 22 adjacent its opposite, inner end is provided with two or more transversely spaced openings 24 through each of which a headed screw 25 loosely extends. Lower ends of the screws 25 are threaded into the frame portion 12 and thereby anchored to the clamp 10 in transverse alignment relative to one another and at points spaced from the ends of the frame 11. The screws 25 are of sufficient length so that their headed upper ends are spaced a substantial distance above the bracket arm portion 22 and each of said screws supports a coiled expansion spring 26 which is loosely disposed around the stem thereof. The upper ends of the springs 26 bear on the undersides of the heads of the screws 25 and the lower ends of said springs bear upon the upper surface of the bracket arm portion 22 for urging said portion downwardly into a position in flush engagement with the top frame part 12. An adjusting screw 27 is threaded downwardly through an opening 28 in the arm portion 22, which opening is located substantially midway of the side edges of said arm portion 22 and spaced a greater distance from its inner end than the openings 24. The lower end of the screw 27 bears upon a portion of the upper surface of the top frame portion 12, between the screws 25 and the outer end of said frame, as defined by the stationary clamp jaw 14.

The container 9 includes a body portion, designated generally 29, having a substantially solid upper part, designated generally 30, formed of any suitable substantially rigid material such as sheet metal which is substantially square in cross section and includes an inner wall 31, an outer wall 32, a rear wall 33 and a front wall 34. Said walls at their upper ends are provided with corresponding inturned flanges 35 combining to define a relatively large opening 36. The opening 36 is normally closed by a door or closure 37 which is swingably supported by hinges 38 which are secured to one of the flanges 35, preferably the flange which extends inwardly from the inner wall 31. The hinges 38 are of the spring hinge type and carry springs 39 the complementary ends of which bear under the closure 37 for urging the closure upwardly, as illustrated in Figures 2 and 4. A stop 40 is secured to another of the flanges 35, preferably the flange which extends inwardly from the outer wall 32. The stop 40 is secured to the upper side of said flange 35 and overlies a portion of the opening 36 sufficiently to form a stop to engage the closure 37 to prevent it from swinging upwardly past a position substantially coplanar to the flanges 35, as seen in Figures 2 and 4. Thus it will be seen that a downward pressure on the closure 37 will swing it downwardly to an open position to expose the opening 36 and when the pressure is released on the upper side of the closure 37, the springs 39 will automatically cause the closure 37 to return to its closed position of Figures 2 and 4.

The container 9 also includes a lower portion of substantial length as compared to the upper portion 30 and of the same cross sectional shape. Said lower portion 41 is of perforated construction and may be formed of mesh wire fabric, as illustrated or of perforated metal or other material and includes a front wall 42, a rear wall 43, side walls 44 and a bottom 45. Said bottom container portion 41 has an open upper end 46 which extends a short distance into the lower open end of the upper portion 30 and which fits snugly therein and is suitably secured permanently thereto.

The container 9 may be of any desired length, sufficient so that a substantial portion thereof will be in a submerged position when suspended vertically by the mounting unit 8 and when said mounting unit is secured to a gunwale 55 of a boat, as will hereinafter be described. Thus, the length of the container 9 will vary depending upon the freeboard of the boat. Further, the container 9 may be of various sizes in cross section and may likewise be of various cross sectional shapes. The container portion 41 is formed of mesh wire fabric and is sufficiently rigid to maintain its shape as illustrated by the utilization of a heavy gauge of mesh wire.

A combination ski and shield 47 is suitably secured to the front wall 42 of the container portion 41. Said ski and shield is formed of a strip of relatively thin rigid material, such as sheet metal, which tapers in width from end-to-end thereof. The member 47 is secured to the front wall 42 from the bottom end thereof upwardly to adjacent the upper end of the wall 42 and with its wider end disposed adjacent the bottom of the wall, as illustrated in Figure 2. A portion of the wider end of the strip 47 extends downwardly below the lower end of the front wall 42 and the container bottom 45 and is curved inwardly to provide a lip 48 which is partially disposed beneath and spaced from said bottom 45. As previously stated, the narrow upper end of the member 47 terminates below the body portion 30 of the container but substantially above the intermedite portion of the perforated container part 41. The part 47 may form a part of the front wall 42 instead of being secured to the outer side thereof, and may be varied in length and width.

The inner side wall 31 on its outer side and intermediate of its ends is provided with an externally disposed boss 49 having a centrally disposed threaded bore 50 opening outwardly thereof. A headed bolt or screw 51 extends outwardly through an opening 52 in the depending bracket portion 23 and has an unengaged portion 53 disposed loosely in said opening 52 and an outer threaded portion which threadedly engages in the bore 50. A washer 54 may be mounted on the unthreaded part of the bolt 51 between its head and the inner side of the bracket arm portion 23. The boss or protuberance 49 spaces the bracket arm portion 23 from the container wall 31 and said portion 23 is loosely disposed between the boss 49 and washer 54 to permit the screw or bolt 51 to swivel in the opening 52, so that the container 9 may swing in a vertical plane relative to the bracket arm 21.

The clamp frame 12 is disposed over the gunwale 55, so that the jaw 14 will be disposed on the outer side of the gunwale and the movable jaw 19 on the inner side thereof. The feed screw 16 is then turned to advance the movable jaw 19 toward the stationary jaw 14 for securing the clamp to the gunwale. The bracket arm 21 extends outwardly from the stationary jaw 14 and the screw 27 is adjusted to raise or lower the bracket arm 21 relatively to the top part 12 of the clamp to position the arm portion 22 in substantially a horizontal plane, as illustrated in Figure 2. This is accomplished by the inner end of the bracket arm fulcruming on the clamp top 12 and the springs 26 cooperate with the screw 27 to maintain the bracket arm in adjusted positions. This adjustment is provided due to the fact that the upper surfaces of most gunwales slope downwardly and outwardly and in order that the depending bracket arm portion 23 may be disposed in a vertical plane to position the container 9 with its longitudinal axis in a vertical plane. It will be readily apparent that the unit 7 may be thus mounted readily on the gunwale of a boat, such as a rowboat, and as previously stated, the container 9 is of sufficient length so that when disposed as illustrated in Figure 2, a substantial portion of its foraminous part 41 will be normally submerged.

A fish can be readily placed in the container 9 by merely pressing downwardly on the closure 37 and dropping the fish through the opening 36, after which the springs 39 will return the closure 37 to a closed position, as previously described, so that there is no risk of loss of fish from the container 9.

Of primary importance in the present invention is the fact that the container 9, unlike most containers supported in a position outboard of a boat, does not have to be removed from such an outboard supported position while the boat is underway and prevents drowning of the fish contained therein and possible damage to the container. When the boat is underway and being power driven at a normal speed, the ski 47 by contact with the water will cause the container part 41 to swing vertically toward the stern of the boat and so that the lower wide portion of the member 47 will ski along the surface of the water and with the container 9 almost completely above the surface of the water, to prevent drowning of the fish contained therein. When moving at a slow trolling speed, the container 9 will swing rearwardly to an inclined position, so that the lower part thereof may be submerged and the member 47 will then function both as a ski and as a shield and will prevent water from passing inwardly through the front wall 42 in sufficient amounts to drown the fish within the container 9. Likewise, should a submerged obstruction be in the path of movement of the submerged end of the container 9, it will be struck by the shield 47, causing the container 9 to swing upwardly and rearwardly to pass thereover without damage to the container.

Various modifications and changes are contemplated and may obviously be resorted to, without departing from the spirit or scope of the invention as hereinafter defined by the appended claims.

I claim as my invention:

1. A container structure of the character described comprising an elongated container having an open end, mounting means adapted to be secured to the side of a boat, means swingably connecting said container adjacent the upper end thereof to said mounting means for swinging movement in substantially a vertical plane about substantially a horizontal axis and by which said container is normally supported in substantially a vertical plane, said container including an elongated lower section at least a part of which including a lower end thereof is adapted to be disposed in a submerged position when the container is vertically disposed and including a front wall, at least a part of said front wall being solid and extending upwardly from the lower end thereof to form a ski and shield, said lower section having another portion disposed adjacent the lower end thereof and formed of a foraminous material, said solid front wall portion functioning as a ski to cause the container to swing upwardly and rearwardly when the boat on which the mounting means is supported is underway and moving forwardly for supporting the lower end of said lower container section above the water surface or in only a slightly submerged position.

2. A container as in claim 1, said solid front wall portion having a lower end of a width substantially equal to the width of the lower end of the front wall and being tapered in width upwardly from the lower end toward the upper end of said front wall.

3. A container as in claim 2, said solid front wall portion comprising a relatively thin strip secured to the outer side of a foraminous inner ply of said front wall of the lower section and including a depending extension extending to below the lower end of said front wall, said depending extension being curved rearwardly to underlie a part of the lower end of said lower container section.

4. A container structure as in claim 3, said strip being of a width substantially equal to the width of said front wall at the lower end thereof and tapering in width toward its upper end and extending upwardly to a point remote from the lower end of said front wall.

5. A container structure as in claim 1, said mounting unit including a clamp adapted to be detachably secured to a gunwale of the boat and including a frame part disposed above the gunwale, a bracket arm connected to said frame part and extending therefrom to an outboard position relative to the clamp and having a depending outer end constituting a part of said means for swingably mounting the container, and manually actuated means for manually adjusting said bracket arm relatively to the clamp for angularly adjusting the axis about which the container is swingably mounted.

References Cited in the file of this patent
UNITED STATES PATENTS

| | | |
|---|---|---|
| 2,272,569 | Luhmann | Feb. 10, 1942 |
| 2,485,684 | Aldredge | Oct. 25, 1949 |
| 2,487,645 | Gershon | Nov. 8, 1949 |